United States Patent [19]

Suarez

[11] 4,061,235

[45] Dec. 6, 1977

[54] VEHICLE WITH SIDE DUMPING MECHANISM OVER THE TOP RAIL

[75] Inventor: Diego Rolando Suarez, Coral Gables, Fla.

[73] Assignee: Inter-American Transport Equipment Company, Miami, Fla.

[21] Appl. No.: 751,191

[22] Filed: Dec. 16, 1976

[51] Int. Cl.² ............................................. B65G 67/24
[52] U.S. Cl. .................................................... 214/64
[58] Field of Search ..................... 214/64, 62 R, 62 A, 214/312, 314; 298/9, 10, 11

[56] References Cited

U.S. PATENT DOCUMENTS

| 1,405,065 | 1/1922 | Nelson | 214/64 X |
| 1,554,608 | 9/1925 | Ryzin | 214/64 X |
| 2,929,658 | 3/1960 | Killebrew | 214/314 X |
| 3,047,916 | 8/1962 | O'Brien | 214/314 X |
| 3,856,354 | 12/1974 | Davis | 298/10 |

FOREIGN PATENT DOCUMENTS 365,972  12/1922  Germany ................. 214/64

*Primary Examiner*—Albert J. Makay
*Attorney, Agent, or Firm*—Fleit & Jacobson

[57] ABSTRACT

A side dumping container vehicle comprising a chassis having front, rear and side portions. A pair of side dumping arms are connected near one side portion of the chassis at the front and rear portions of the chassis. These side dumping arms are reinforced at the side of the chassis by interconnecting reinforcing members. The side dumping arms are further reinforced at the front and rear of the chassis by front and rear reinforcing members interconnecting the dumping arms to the base of the chassis. A container for carrying various articles is supported on the chassis. The container comprises a base, a side dumping siding forming one side of the container, front and rear sidings, and a lifting siding forming a side of the container opposite the side dumping siding. Hinges are provided to pivotally connect the side dumping siding of the container to the pair of side dumping arms so that the container can be pivoted over the side dumping arms to dump the contents of the container. Mounted on the lifting siding of the container are supporting means which are adapted to support a lifting bar. The lifting bar is connected by means of chains to the base of the container on the side closest to the side dumping arms. The movement of the lifting bar away from the supporting means by means of a crane or other suitable lifting apparatus, pivots the container about the pivot means to effectuate the dumping operation. Limiting means are provided for limiting the movement of the container during dumping. This limiting means can comprise a chain which is connected from the container to the chassis of the vehicle.

11 Claims, 6 Drawing Figures

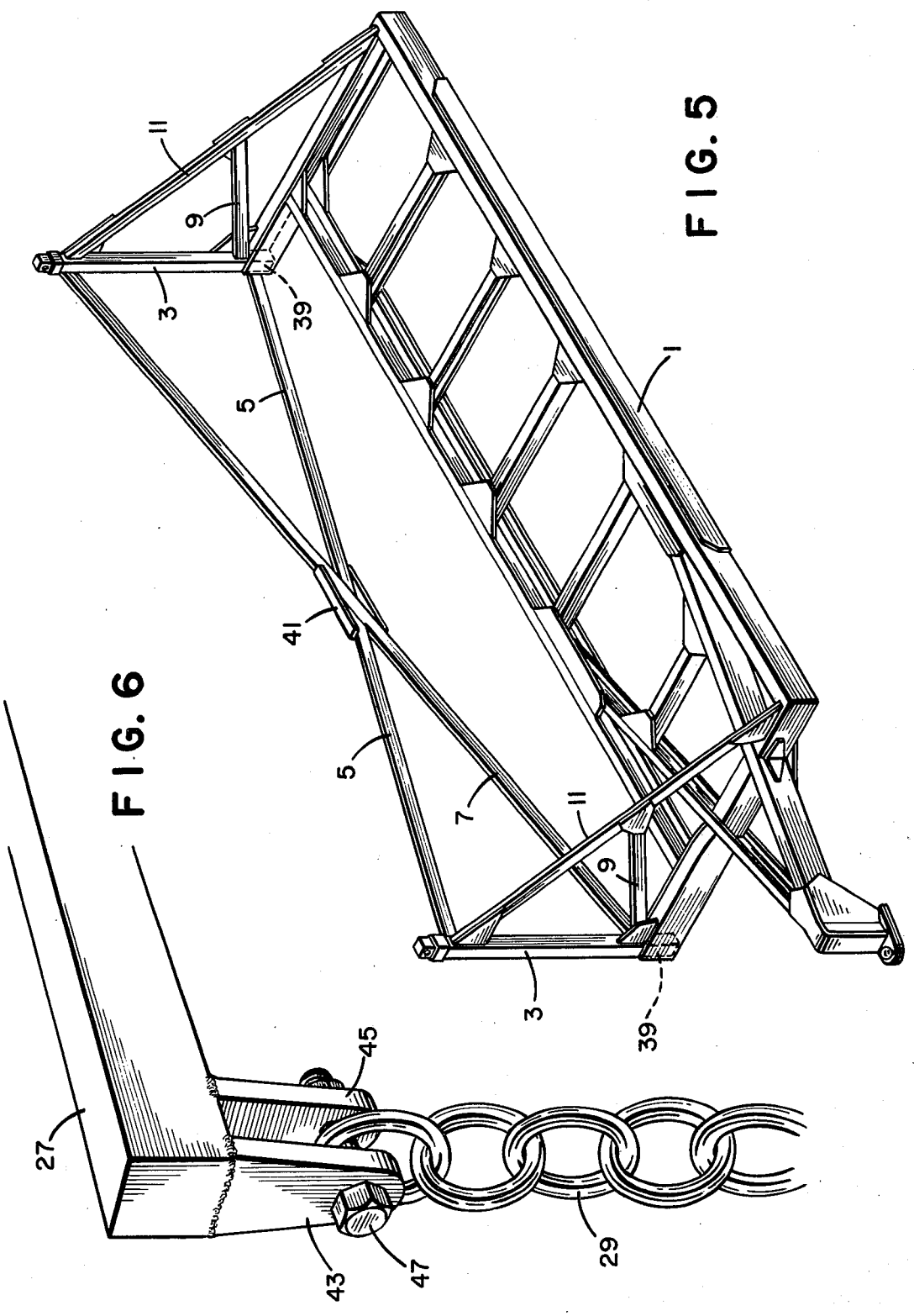

VEHICLE WITH SIDE DUMPING MECHANISM OVER THE TOP RAIL

BACKGROUND AND SUMMARY OF THE INVENTION

The invention relates to a vehicle with a side dumping mechanism for dumping the contents of a container over the top and side rail of the vehicle. The vehicle is particularly useful in sugar cane loading and unloading operations, although the invention is not limited thereto.

Many container vehicles with side dumping mechanisms are known in the art. Such vehicles have sophisticated dumping mechanisms whereby hydraulic piston and cylinder arrangements provide the motive power for raising and pivoting a container over the side of the vehicle. Other vehicles are used in sugar cane dumping operations whereby a chain hoist is used to lift a light weight flexible net rather than a rigid container structure.

The present invention relates to a new and unique structure for a sugar cane dumping vehicle with side dumping. It is an object of this invention to provide a simple vehicle structure capable of carrying sugar cane or other defined cargo volume whereby the side dumping of a rigid container frame can be effectuated without elaborate hydraulic and pneumatic cylinder arrangements. In particular, it is an object of this invention to provide a side dumping vehicle mechanism to be used with a conventional mechanical lifting device with lifting hooks to pivot a rigid frame container over the side of the vehicle.

It is still further an object of this invention to provide a dumping vehicle having a lifting bar connected by cables or chains to the container whereby the raising of the lifting bar pivots the container over the side frame of the vehicle.

Yet another object of this invention is to provide a vehicle for dumping a given volume of cargo at a relatively high distance above the ground to accomodate it to existing sugar cane facilities.

Another object of this invention is to provide a limiting mechanism, such as a chain cable, to limit the angular displacement of the container as it pivots over the side frame of the container vehicle.

These and other objects of the invention, as well as many of the attendent advantages thereof, will become more readily apparent when reference is made to the following description, taken in conjunction with the accompanying drawings.

BRIEF DESCRIPTION OF THE DRAWINGS

FIG. 5 shows a perspective view of the frame;
and
FIG. 6 shows a portion of the lifting bar with a chain interconnection.

DETAILED DESCRIPTION OF THE DRAWINGS

Figure 1:
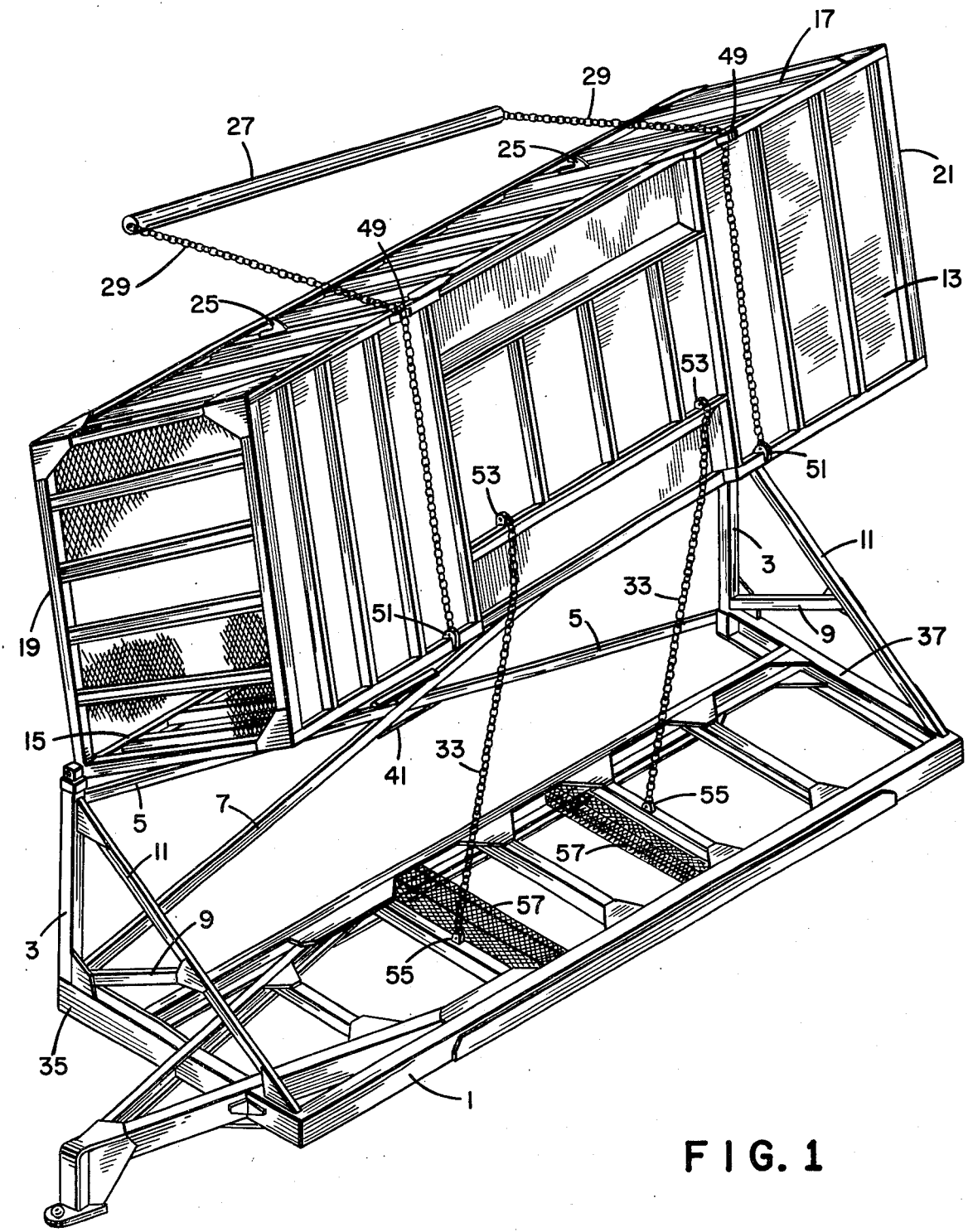
FIG. 1 shows a perspective view of the side dumping container vehicle without the wheels of the vehicle.
Figure 2:
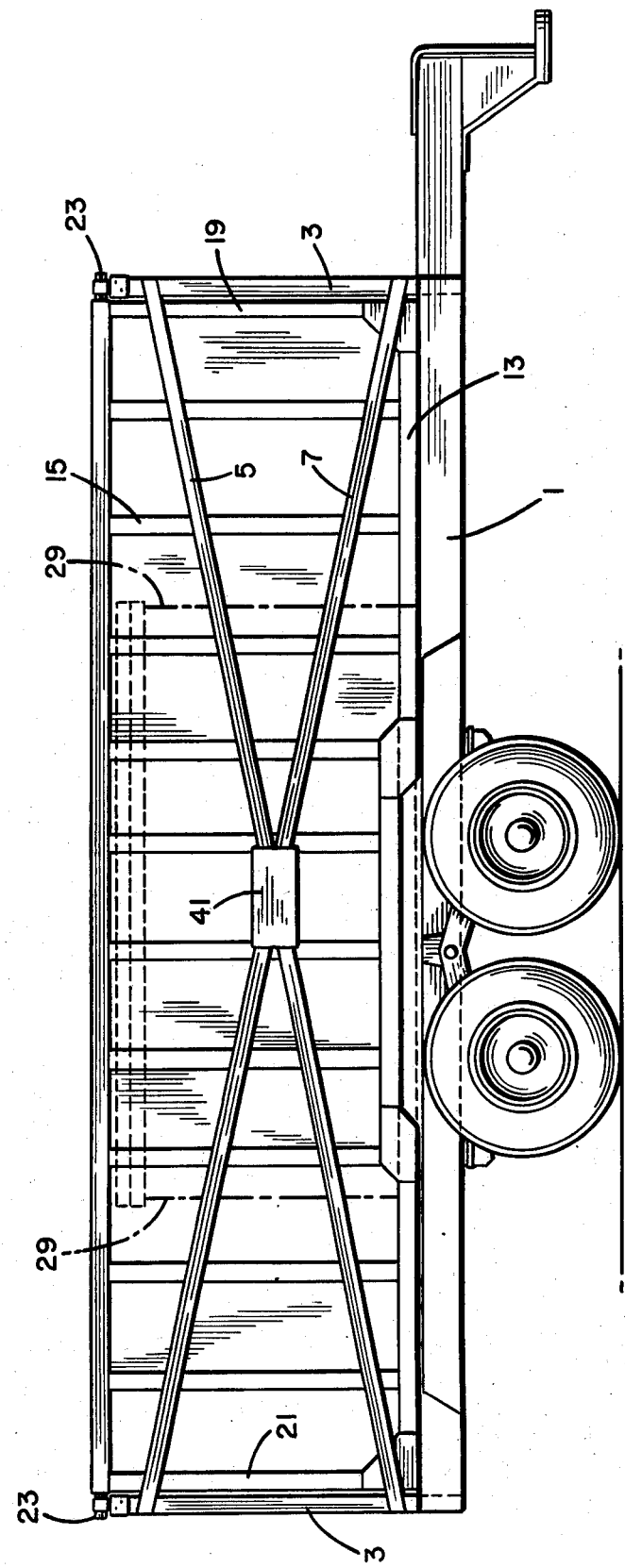
FIG. 2 shows a side view of the container vehicle.
Figure 3:
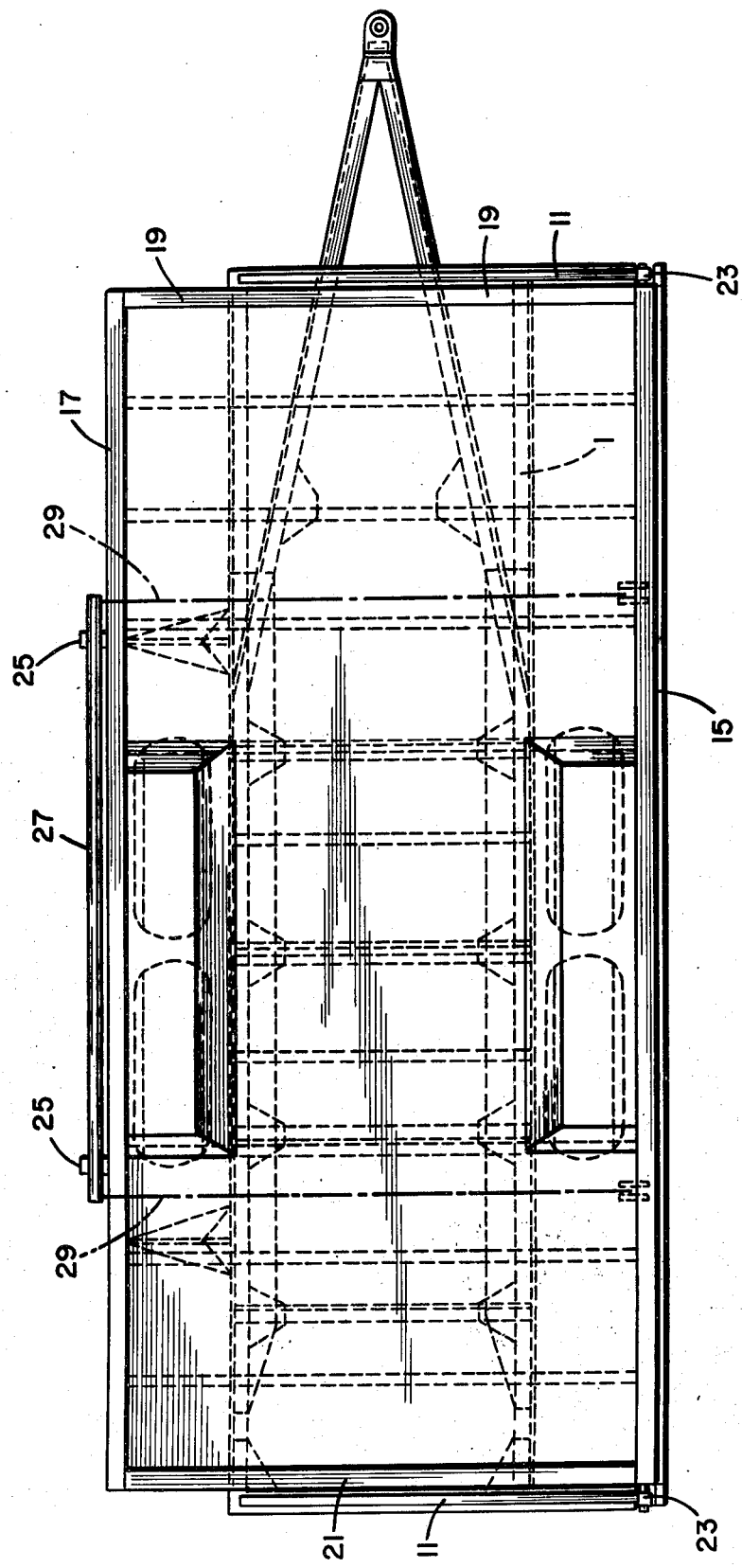
FIG. 3 shows a plan view of the container vehicle.

The invention relates to a vehicle with a side dumping mechanism for dumping a container over the side of the vehicle. The invention comprises a vehicle chassis 1 having a flat bed portion that is rectangularly shaped. Side dumping arms 3 are mounted perpendicularly to the base of the chassis near one side of the chassis. The side dumping arms are supported by side reinforcing members 5 and 7, and front and rear supporting members 9 and 11. Mounted on the base of the chassis is a container having a base or bottom platform 13, a side dumping siding 15, a lifting siding 17, and front and rear sidings 19 and 21. The side dumping siding 15 is pivotally connected to the side dumping arms 3 at hinge points 23. Mounted on the lifting siding are supporting members 25 which are adapted to support a lifting bar or arm 27. The lifting bar or arm 27 is connected by means of chains 29 to the container, whereby the lifting of the lifting bar 27 by means of lifting hooks 31 attached to a suitable crane mechanism, lifts and pivots the container about pivot points 23 to dump the contents of the container over the side of the vehicle. A means for limiting the pivotal movement of the container during dumping is also provided by cable chains 33.

The vehicle comprises a chassis 1 which is supported by wheels. The chassis 1 has front, rear and side portions which are generally rectangularly shaped. The front and rear portions are extended from one side portion as shown at 35 and 37 in FIG. 1. Mounted on extended portions 35 and 37 of the chassis 1 are a pair of side dumping arms 3, which extend perpendicularly from the chassis. The side dumping arms 3 are inserted into slots 39 of the chassis and then welded to provide a firm support, as shown in FIG. 5. Side reinforcing members 5 and 7 are shown to interconnect the two side dumping arms together to provide stability. The side reinforcing members are shown to be two cross-connected beams 5 and 7, joined by a support 41, although other forms of reinforcement along the sides can be employed so long as the side dumping arms are properly reinforced. As shown in FIG. 5, the reinforcing members 5 and 7 are designed to support the stresses of tension in a horizontal direction. Support 41 is a reinforcing bracket in the shape of a channel to solidly join with members 5 and 7. Beam 7 is a single structural rectangular beam whereas 5 is shown in FIG. 5 as two beams spliced against beam 7. Along the front and rear portions of the chassis are reinforcing members 9 and 11. These reinforcing members comprise a pair of reinforcing bars that interconnect the side dumping arms 3 with the chassis 1.

The container is a generally rectangularly shaped box-like rigid structure made up of a side dumping siding 15, front and rear sidings 19 and 21, and a lifting siding 17. Each of these sidings comprise a rectangular frame structure having interconnecting bars which provide the rigid side, front, and rear supports. Expanded sheet metal can be provided to interconnect the interconnecting bars. The side, front and rear portions of the container are supported by a container platform or base 13 which similarly comprises a rectangular frame section with interconnecting parallel beams. Solid sheets of metal can be provided to interconnect the bottom parallel beams.

The container is pivotally connected at 23 to the side dumping arms 3. The pivotal connection comprises a pair of hinges 23 interconnecting the side dumping arms 3 to the top portion of the side dumping siding 15 of the container. The hinges are shown to comprise a pin connected to the side dumping siding 15 and a bushing mounted at the top of the side dumping arms 3, whereby the pin is rotatable in the bushing. Grease fittings can be provided for greasing the bushing. Other hinge arrangements can be used and are well known to those of ordinary skill in the art.

Mounted on the lifting siding 17 is a supporting member 25 which is shown to comprise two hook-shaped elements mounted along the lifting siding of the container. These hook-shaped elements are designed to support a lifting bar or rod 27. Lifting bar or rod 27 is connected by means of a cable, such as a chain 29, to the container. While the rod 27 is shown schematically as a tubular member, any shaped element can be used. The chain 29 is connected to the rod 27 by any suitable means so long as a durable, secure interconnection is provided. For example, in FIG. 6, the lifting bar is shown to be rectangular in cross-section and has a pair of flanges 43, 45 interconnecting the chain 29 with a bolt 47, for easy changing of broken chains. The chain 29 extends along the lifting siding 17 of the container, guided by guides 49, around the base of the container 13 and is attached to an eyelet 51 mounted on the container base near the side dumping siding of the container. It should be apparent to those of ordinary skill in the art that the chain connecting the lifting bar to the container can be mounted to the container in other positions on the container. During transport of the vehicle, the lifting bar 27 remains supported on the supporting member 25.

Figure 4:
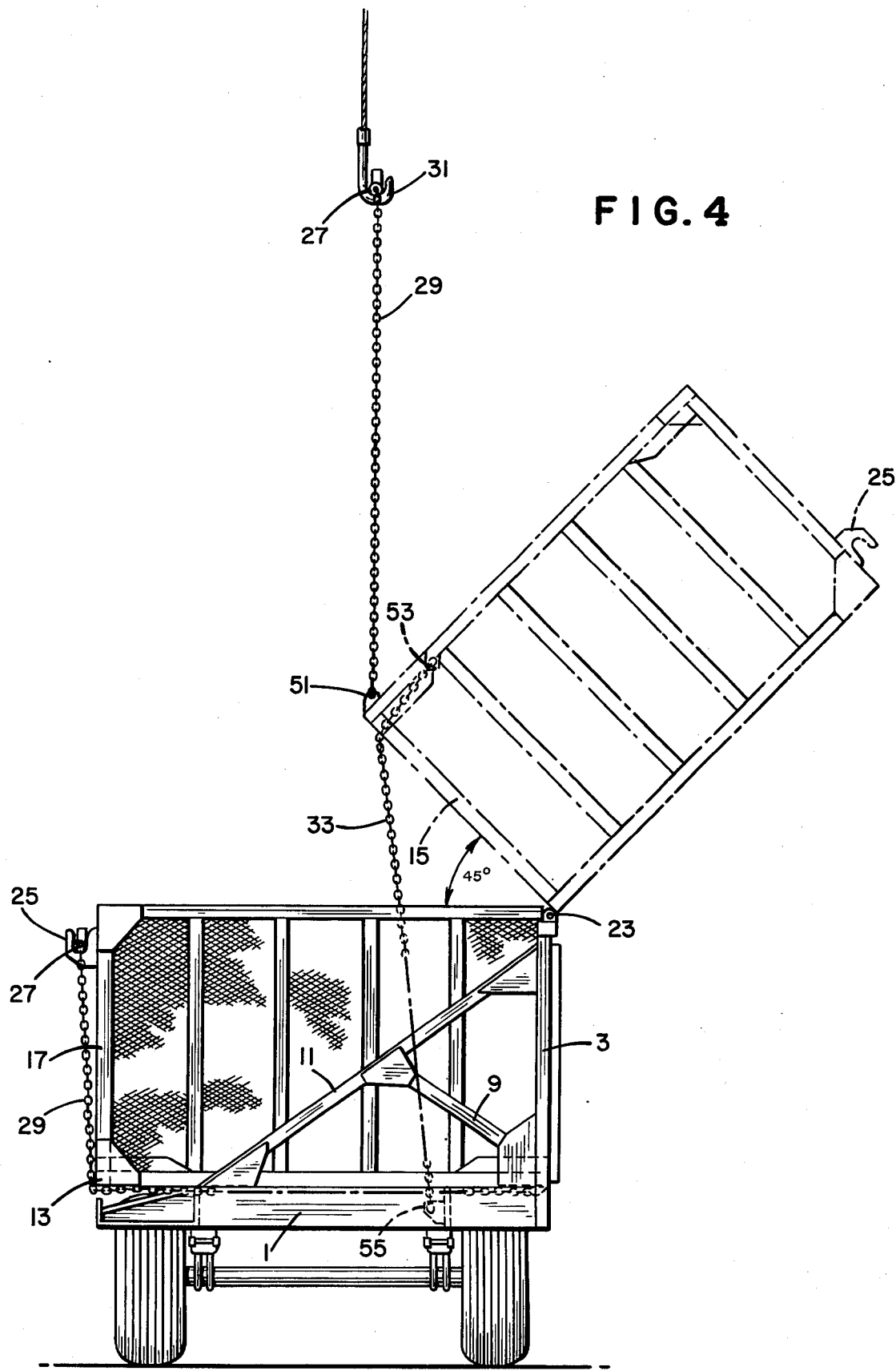
FIG. 4 shows a rear view of the container vehicle.

In operation, a conventional mechanical lifting device, such as a crane, winch or any other known device, is provided with lifting hooks 31 to lift the lifting bar 27 from the supporting member 25. This lifting operation results in the lifting of the container by means of the chain 29 which is wrapped around the container base and connected to the bottom of the container base near the side dumping siding 15 at eyelet 51. The lifting hook lifts the lifting bar to a position such that the container is pivoted around the side dumping arms 3 to empty the contents of the container. A limiting mechanism such as a cable or chain 33 is connected from the bottom of the container base at 53 to the chassis at 55. Cable 33 limits the movement of the container so that the side dumping siding will obtain a 45° angle with the horizontal, as shown in FIG. 4. The limiting chain 33 is connected to the chassis at a point 55, by connecting the chain to bolts mounted on the chassis cross-members. Expanded sheet metal boxes 57 open at the top can be provided to retain the chains so that they do not drag on the ground during the container transport. The container can be returned to the chassis after dumping by forces acting on its center of gravity, or alternatively, assist means can be provided to push the container back down.

The figures described herein represent a preferred embodiment of the dumping vehicle, however other embodiments and numerous modifications are well within the scope of the present invention. These other embodiments and modifications would be apparent to those of oridinary skill in the art.

What is claimed is:

1. A side dumping container vehicle comprising:
   a. a chassis having front, rear and side portions;
   b. a pair of side dumping arms each connected to the front and rear portions of the chassis near one side portion of said chassis,
   c. means for reinforcing said pair of side dumping arms to said chassis,
   d. a rigid container comprising a base, a side dumping siding forming one side of the container, front and rear sidings, and a lifting siding forming a side of the container opposite the side dumping siding, wherein said container is supported by said chassis with the side dumping siding adjacent said pair of side dumping arms,
   e. pivot means for pivotally connecting said side dumping siding of said container to said pair of side dumping arms,
   f. supporting means for supporting a lifting bar mounted on said lifting siding, said supporting means comprises a pair of hook shaped members attached to said lifting siding near the top of said lifting siding,
   g. a lifting bar adapted to be supported by said supporting means, said lifting bar comprises an elongated bar having a length greater than the distance between said pair of hook shaped members so as to be received and supported by said hook shaped members, and adapted to be lifted from said hooked shaped members by a lifting device,
   h. means for interconnecting said lifting bar to said container, whereby movement of said lifting bar away from said supporting means pivots said container about said pivot means for dumping the contents of said container, wherein said means for interconnecting said lifting bar to said container comprises plural cable means being connected at one end to said lifting bar and being connected at its other end to said container, and
   i. limiting means for limiting the pivotal movement of said container during dumping.

2. A side dumping container vehicle as claimed in claim 1 wherein said means for reinforcing said pair of side dumping arms comprise side reinforcing members interconnecting said pair of side dumping arms, front reinforcing members interconnecting said side dumping arm connected at the front portion of said chassis to said chassis, and rear reinforcing members interconnecting the side dumping arm connected at the rear portion of said chassis to said chassis.

3. A side dumping container vehicle as claimed in claim 1 wherein said pivot means comprise a pair of hinges, each hinge interconnecting one of said side dumping arms to the top portion of said side dumping siding of said container.

4. A side dumping container vehicle as claimed in claim 3 wherein each of said hinges comprises a pin connected to said side dumping siding, and a bushing mounted at the top of said side dumping arm, whereby said pin is rotatable in said bushing.

5. A side dumping container vehicle as claimed in claim 1 wherein said plural cable means comprises a pair of chains.

6. A side dumping container vehicle as claimed in claim 5 wherein said pair of chains extends from said lifting bar downward along the lifting siding of the container, and underneath said base of said container wherein the ends of said chains are connected to the base of said container near the side dumping siding of said container.

7. A side dumping container vehicle as claimed in claim 1 wherein said limiting means is adapted to limit the pivotal movement of said container to a position whereby the side dumping siding of said container forms an angle with the horizontal of approximately 45°.

8. A side dumping container vehicle as claimed in claim 1 wherein said limiting means comprises a cable, one end of which is connected to the chassis, and the other end of which is connected to said container.

9. A side dumping container vehicle as claimed in claim 8 wherein the other end of said cable is connected to the container at the base thereof.

10. A side dumping container vehicle as claimed in claim 9 wherein said cable comprises a chain.

11. A side dumping container vehicle as claimed in claim 1 wherein the front, rear, and side portions of said chassis have a rectangular shape and said front and rear portions have extended portions from the one side portion, wherein said side dumping arms are connected to the front and rear extended portions.

* * * * *